US006609111B1

(12) United States Patent
Bell (10) Patent No.: US 6,609,111 B1
(45) Date of Patent: Aug. 19, 2003

(54) METHOD AND APPARATUS FOR MODELING AND EXECUTING DEFERRED AWARD INSTRUMENT PLAN

(76) Inventor: Lawrence L. Bell, 18 Farmington Ct., Chevy Chase, MD (US) 20815

( * ) Notice: Subject to any disclaimer, the term of this patent is extended or adjusted under 35 U.S.C. 154(b) by 64 days.

(21) Appl. No.: 09/690,891

(22) Filed: Oct. 18, 2000

Related U.S. Application Data (63) Continuation-in-part of application No. 09/177,131, filed on Oct. 22, 1998, now Pat. No. 6,161,096.

(51) Int. Cl.[7] .............................................. G06F 17/60
(52) U.S. Cl. ................................ 705/36; 705/1; 705/4; 705/35; 707/104.1
(58) Field of Search ................................ 705/36, 1, 40, 705/30, 35, 37, 38; 707/104.1

(56) References Cited

U.S. PATENT DOCUMENTS

| | | | |
|---|---|---|---|
| 3,634,669 A | | 1/1972 | Soumas |
| 4,648,037 A | * | 3/1987 | Valentino .................... 235/379 |
| 4,837,693 A | | 6/1989 | Schotz |
| 5,136,502 A | | 8/1992 | VanRemortel |
| 5,191,522 A | | 3/1993 | Bosco et al. |
| 5,206,803 A | | 4/1993 | Vitagliano et al. |
| 5,233,514 A | | 8/1993 | Ayyoubi et al. |
| 5,429,506 A | | 7/1995 | Brophy et al. |
| 5,590,037 A | | 12/1996 | Ryan et al. |
| 5,631,828 A | | 5/1997 | Hagan |
| 5,752,236 A | | 5/1998 | Sexton et al. |
| 5,761,441 A | | 6/1998 | Bennett |
| 5,802,500 A | | 9/1998 | Ryan et al. |
| 5,839,118 A | | 11/1998 | Ryan et al. |
| 5,907,828 A | | 5/1999 | Meyer et al. |
| 5,913,198 A | | 6/1999 | Banks |
| 5,966,693 A | | 10/1999 | Burgess |
| 5,999,917 A | * | 12/1999 | Facciani et al. .......... 254/10 C |
| 6,026,364 A | | 2/2000 | Whitworth et al. |
| 6,092,047 A | | 7/2000 | Hyman et al. |
| 6,205,434 B1 | | 3/2001 | Ryan et al. |
| 6,304,859 B1 | | 10/2001 | Ryan et al. |
| 2001/0049612 A1 | | 12/2001 | Davis |

FOREIGN PATENT DOCUMENTS

| | | | | |
|---|---|---|---|---|
| GB | 2358720 | * | 8/2001 | ........... G06F/17/60 |
| WO | WO 00/23927 | | 4/2000 | |

OTHER PUBLICATIONS

Bell, L. 'Benefit of Clout: Combining equity split–dollar insurance with other little–used financial planning tools can open up a wealth of benefit–planning opportunities', Financial Planning, Nov. 1999.*

Bell, L. 'Valuation of Buy–Sell Agreements Under Chapter 14 of the Internal Revenue Code', Journal of the American Society of CLU & ChFC, v46, n5, pp. 48–53, Sept. 1992.*

Goldstein, M.G., 'Adding split–dollar to deferred comp. plans', Drennan, W.A., National Underwriter (LifeHealth-Financial Sevices), v102, n9, pp. 7 (22).*

(List continued on next page.)

Primary Examiner—Jeffrey Pwu
(74) Attorney, Agent, or Firm—Dickstein Shapiro Morin & Oshinsky LLP (57) ABSTRACT

The present invention is directed to the administration of various deferred compensation programs that can effectively reduce an individual's income or estate tax by assisting a company in the identification of appropriate employees, and through the use of a novel modeling method and apparatus to implement a deferred compensation program through a novel Rabbi Trust maintenance plan that permits the employees to benefit from their deferred compensation (such as stock options or life insurance benefits), while having a minimal financial impact on the company.

10 Claims, 6 Drawing Sheets

OTHER PUBLICATIONS

Tourmey, D., 'Compensation & Benefits Review', Compensation & Benefits Review, v28, n4, p. 21–30, Jul./Aug. 1996.*

Goldstein, Michael G. Drennan, William A.; Financing a SERP and Split Dollar Plan with a Single Policy; Journal of the American Society of CLU & ChFC; v51n1 pp 34–43, 1/97.

Bell, L. 'Benefit of Clout: Combining equity split–dollar insurance with other little–used financial planning tools', Financial Planning, 11/99, file 16: Gale Group PROMT ® Dialog Access #06909697.

Bell, L. 'Valuation of Buy–Sell Agreements Under Chap 14 of the Internal Revenue Code,' Journal of the Amer. Society of CLU & ChFC, v46, n5, pp. 48–53, 9/92. File 15: ABI/Inform® Dialog #00631791.

Goldstein, M.G., 'Adding split–dollar to deferred comp. Plans', Drennan, W.A., National Underwriter (Life/Health/Financial Services), v102, n9, pp. 7 (22). File 15: ABI/Inform® Dialog Access #01589870.

Tourmey, D., 'Compensation & Benefits Review', Compensation & Benefits Review, v28, n4, p. 21–30, Jul./Aug. 1996, File 15: ABI/Inform® Dialog Accession #01298520.

MacDonald, William L., *Executive Deferred Compensation—Earned but not yet Received Chat Transcript,* (May 24, 2001), at http://www.crgworld.com/whatsnew2001may_01.html.

Quigg, James, *Tax–Saving Life Insurance Plans,* Enlightened Choices Newsletter (American Benefits Institute), Dec. 2001, at 6–7.

* cited by examiner

UNIQUE SOLUTION® 419 EWB PLAN FOR EMPLOYEE A

| | | POLICY VALUES | | | 419 EWB PLAN | | | | | UNIQUE SOLUTION® PLAN | | | | | | |
|---|---|---|---|---|---|---|---|---|---|---|---|---|---|---|---|---|
| | | | | | | | | | | EMPLOYER | | | EMPLOYEE | | | |
| YEAR | AGE | Total premium placed in "combination policy." PREMIUM | Total death benefit in "combination policy." DEATH BENEFIT | Total cash surrender value in "combination policy." SURR. VALUE | Total premium attributed to "419 EWB Plan." PREMIUM | Total death benefit attributed to "419 EWB Plan." DEATH BENEFIT | Total cash surrender value attributed to "419 EWB Plan." SURR. VALUE | Imputed income to employee attributed to 419 Plan Advantage Trust death benefit throught. IMPUTED INCOME | Employee tax on imputed income attributed to 419 Advantage Trust death benefit through. TAX ON IMPINC | Employer premium attributed to UNIQUE SOLUTION® Plan. PREMIUM | Employer death benefit attributed to UNIQUE SOLUTION® Plan. DEATH BENEFIT | Employer cash surrender value attributed to UNIQUE SOLUTION® Plan. SURR. VALUE | Employee death benefit attributed to UNIQUE SOLUTION® Plan. DEATH BENEFIT | Employee cash surrender value attributed to UNIQUE SOLUTION® Plan. SURR. VALUE | Imputed income to employee attributed to UNIQUE SOLUTION® Plan death benefit. IMPUTED INCOME | Employee tax on imputed income attributed to UNIQUE SOLUTION® Plan death benefit. TAX ON IMPINC |
| 1 | 45 | 105,000 | 7,088,046 | 0 | 100,618 | 7,000,000 | 0 | 6,580 | 2,632 | 4,382 | 4,382 | 4,382 | 83,664 | -4,382 | 79 | 31 |
| 2 | 46 | 105,000 | 7,182,143 | 90,583 | 100,618 | 7,000,000 | 0 | 6,930 | 2,772 | 4,382 | 8,764 | 8,764 | 173,379 | 81,819 | 172 | 69 |
| 3 | 47 | 105,000 | 7,282,826 | 191,266 | 100,618 | 7,000,000 | 0 | 7,280 | 2,912 | 4,382 | 13,146 | 13,146 | 269,680 | 178,120 | 280 | 112 |
| 4 | 48 | 105,000 | 7,391,561 | 311,411 | 100,618 | 7,000,000 | 0 | 7,630 | 3,052 | 4,382 | 17,528 | 17,528 | 374,033 | 292,883 | 408 | 163 |
| 5 | 49 | 105,000 | 7,509,060 | 440,390 | 100,618 | 7,000,000 | 0 | 8,190 | 3,276 | 4,382 | 21,910 | 21,910 | 487,150 | 418,480 | 570 | 228 |
| 6 | 50 | 105,000 | 7,636,982 | 579,722 | 100,618 | 7,000,000 | 0 | 8,610 | 3,444 | 4,382 | 26,292 | 26,292 | 610,690 | 553,430 | 751 | 300 |
| 7 | 51 | 105,000 | 7,774,491 | 728,711 | 100,618 | 7,000,000 | 0 | 9,240 | 3,696 | 4,382 | 30,674 | 30,674 | 743,817 | 698,137 | 982 | 393 |
| 8 | 52 | 105,000 | 7,922,437 | 888,067 | 100,618 | 7,000,000 | 0 | 9,800 | 3,920 | 4,382 | 35,056 | 35,056 | 887,381 | 853,011 | 1,242 | 497 |
| 9 | 53 | 105,000 | 8,082,627 | 1,059,737 | 100,618 | 7,000,000 | 0 | 10,570 | 4,228 | 4,382 | 39,438 | 39,438 | 1,043,189 | 1,020,299 | 1,575 | 630 |
| 10 | 54 | 105,000 | 8,255,286 | 1,243,786 | 100,618 | 7,000,000 | 0 | 11,550 | 4,620 | 4,382 | 43,820 | 43,820 | 1,211,446 | 1,199,966 | 1,999 | 800 |
| 11 | 55 | 105,000 | 8,446,870 | 1,446,870 | 100,618 | 7,000,000 | 0 | 12,600 | 5,040 | 4,382 | 48,202 | 48,202 | 1,398,668 | 1,398,668 | 2,518 | 1,007 |
| 12 | 56 | 105,000 | 8,655,111 | 1,655,111 | 100,618 | 7,000,000 | 0 | 13,720 | 5,488 | 4,382 | 52,584 | 52,584 | 1,602,527 | 1,602,527 | 3,141 | 1,256 |
| 13 | 57 | 105,000 | 8,881,509 | 1,881,509 | 100,618 | 7,000,000 | 0 | 14,630 | 5,852 | 4,382 | 56,966 | 56,966 | 1,824,543 | 1,824,543 | 3,813 | 1,525 |
| 14 | 58 | 105,000 | 9,126,845 | 2,126,845 | 100,618 | 7,000,000 | 0 | 15,400 | 6,160 | 4,382 | 61,348 | 61,348 | 2,065,497 | 2,065,497 | 4,544 | 1,818 |
| 15 | 59 | 105,000 | 9,394,612 | 2,394,612 | 100,618 | 7,000,000 | 0 | 15,960 | 6,384 | 4,382 | 65,730 | 65,730 | 2,328,882 | 2,328,882 | 5,310 | 2,124 |
| 16 | 60 | 105,000 | 9,684,216 | 2,684,216 | 100,618 | 7,000,000 | 0 | 16,450 | 6,580 | 4,382 | 70,112 | 70,112 | 2,614,104 | 2,614,104 | 6,143 | 2,457 |
| 17 | 61 | 105,000 | 9,998,537 | 2,998,537 | 100,618 | 7,000,000 | 0 | 17,010 | 6,804 | 4,382 | 74,494 | 74,494 | 2,924,043 | 2,924,043 | 7,105 | 2,842 |
| 18 | 62 | 105,000 | 10,339,833 | 3,339,833 | 100,618 | 7,000,000 | 0 | 18,130 | 7,252 | 4,382 | 78,876 | 78,876 | 3,260,957 | 3,260,957 | 8,446 | 3,378 |
| 19 | 63 | 105,000 | 10,710,571 | 3,710,571 | 100,618 | 7,000,000 | 0 | 20,020 | 8,008 | 4,382 | 83,258 | 83,258 | 3,627,313 | 3,627,313 | 10,374 | 4,150 |
| 20 | 64 | 105,000 | 11,112,562 | 4,112,562 | 100,618 | 7,000,000 | 0 | 22,050 | 8,820 | 4,382 | 87,640 | 87,640 | 4,024,922 | 4,024,922 | 12,679 | 5,071 |

ASSUMPTIONS: EMPLOYER TAX RATE: 40.00% EMPLOYER TAX RATE: 40.00%

FIG. 6

METHOD AND APPARATUS FOR MODELING AND EXECUTING DEFERRED AWARD INSTRUMENT PLAN

This application is a continuation-in-part of application Ser. No. 09/177,131 filed on Oct. 22,1998, now U.S. Pat. No. 6,161,096, the entirety of which is hereby incorporated by reference.

I. BACKGROUND

A. Field of the Invention

The present invention relates to a computer system and method for modeling and administrating a deferred award instrument plan.

B. Background of the Art

Increased competition among companies has led to the use of stock options as a tool to both recruit and maintain highly skilled labor. Stock options are used as a form of compensation that reward employees for their labor. Employer corporations grant employees the right to purchase stock in the employer at a fixed price. As new products or services are introduced and the stock price rises, the employee's stock options become more and more valuable. This option, for example, may be given for past service or as incentive for future performance.

When stock options are granted, the price at which the employee has the right to purchase the stock is referred to as the Grant Price. If the options are not exercised in a predetermined period of time, they often lapse. The difference between the Grant Price and the trade price of the stock in the appropriate exchange, (hereinafter "Market Price" of "FMV") is referred to as the Spread.

There are several different types of stock options that can be granted. Options may be Qualified, commonly referred to as Incentive Stock Options (ISO) that are governed by Sections 422 and 424 of the United States Tax Code. Options may also be Non-Qualified, commonly referred to as Non-Qualified Options (NSO).

There are numerous reasons why it is not desirable to issue too many stock options and/or have them exercised. First, the limited life of most options has cash liquidity ramifications on the employee. The selling of stock to cover stock option costs by key employees can have a negative impact on the company.

A second downside to stock options is taxes. If an NSO is exercised while the employee is alive, the Spread is immediately subject to ordinary income tax. For the stock that is held, the amount of appreciation over the Spread is subject to capital gains taxes when it is ultimately sold. The Spread on the stock that is not held and sold immediately upon exercise of the options is subject to ordinary income tax. Alternative minimum tax is applicable to the Spread of an ISO when it is exercised and capital gains tax is applicable on the difference between the Grant Price and the ultimate sales price of the stock.

If an NSO or ISO is not exercised when the employee is alive, the added burden of estate tax must also be computed. For example, an employee's family can expect to receive only 12% of the proceeds after taxes on a stock option that has a Market Value that is twice the grant price. The greater number of options awarded the larger the problem becomes. If an employee does not have enough cash to satisfy the Grant Price and taxes associated with an exercise, the employee is forced to sell stock, which only aggravates the tax consequences and reflects poorly on the company.

Many of the issues associated with stock option plans are also present with other deferred compensation programs offered by companies today. Many of these programs also require a significant outlay by the company to compensate or reward an employee. These outlays can detract from a company's bottom line in the near term. What is therefore needed in the art is a new program, method and apparatus by which a company can compensate its best employees over an extended period, thus minimizing the employees' tax consequences, while at the same time allowing the company to take maximum tax deductions and recoup many of the costs associated with the administration of these compensation programs.

II. SUMMARY OF THE INVENTION

The present invention is directed to solving the aforesaid problems by providing a unique computer system and computer program for assisting the company's identification of appropriate employees, through the use of a novel modeling method and apparatus. Another aspect of the invention includes a program that administers a Rabbi Trust unit that permits the employee to benefit from his/her deferred compensation programs, such as stock options and other extended income programs such as life insurance benefits, while having a minimal impact on the company. Further, the present invention includes a system that implements a financial management plan that minimizes tax and maximizes employee benefits, as well as maximizes tax advantages for the company.

Briefly described, the present invention provides an automated Deferred Award Stock Option Plan (DASO® Plan) that permits employees to benefit from their stock options, or other deferred compensation and income programs, while minimizing the tax consequences and negative impact on the company. The invention also provides a UNIQUE SOLUTION™ Plan (alternatively referred to as a Guaranteed Reduced Estate and Income Tax (GREIT™) Plan) and a TARGET™ Plan (defined as a GREIT™ Plan for a non-profit/not-for-profit employer, corporation or entity and will also be encompassed hereinafter for simplicity by the term "UNIQUE SOLUTION™ Plan"), as well as a combination UNIQUE SOLUTION™/Employee Welfare Benefit (EWB) Plan that additionally allows a company to take maximum advantage of tax deductions and benefits which may be associated with the plans. The present invention comprises a method and system for modeling the programs to determine if the programs are appropriate for a given individual and company, as well as a method of maintaining and operating the individual elements of the invention.

A further object of the present invention is to provide a method and computer system for identifying individuals from a predetermined pool that fit predetermined company goals for inclusion in the DASO® Plan, UNIQUE SOLUTION™, and the combination UNIQUE SOLUTION™/EWB Plan.

A further object of the present invention is to provide a method and computer system for the effective and efficient management of a Rabbi Trust designed to implement the DASO® Plan, UNIQUE SOLUTION™ Plan, and the combination UNIQUE SOLUTION™/EWB Plan.

The present invention is directed to a method for identifying and administering deferred award instrument plans through a computer system, said method comprising the steps of: identifying at least one participant in said deferred award plan; retrieving financial data related to deferred compensation (such as stock options or other compensation)

corresponding to said identified participant and to an employee welfare benefit pursuant to an employee welfare benefit plan for said participant; computing a spread associated with said deferred compensation; establishing a rabbi trust with said spread; determining whether a life insurance policy has been purchased by or on behalf of said participant, said life insurance policy combining features of a deferred compensation plan and an employee welfare benefit plan; determining whether a split dollar agreement has been executed; monitoring and paying at least one premium for said life insurance policy; and notifying said participant that an nth payment associated with said life insurance policy has been paid. After the nth payment has been made, the employee may borrow against the policy with minimal or no tax consequences, in accordance with IRS regulations. When the employee dies, his estate tax may also be reduced as a result of this arrangement.

The present invention is also directed to a method of modeling deferred award instrument plan programs comprising the steps of: inputting models factors; retrieving human resource data; retrieving deferred compensation data and employee welfare benefit data; retrieving fair market value information relating to said data; computing company cost and length of program; and storing said retrieved and computed data. The method may also include converting said human resource data to a deferred award instrument plan format or converting said deferred compensation and/or said employee welfare benefit data to a deferred award instrument plan format.

It is also contemplated that the present invention may include inputting weighing indicators corresponding to said model factors and displaying at least a predetermined portion of said retrieved and stored data based on said weighing indicators.

The present invention is also directed to an apparatus for implementing a deferred award instrument plan comprising: a processor; memory operationally attached to said processor; an input device operationally attached to said processor; a display device operationally attached to said processor; and wherein said memory comprises a deferred award instrument plan program comprising the steps of inputting models factors; retrieving human resource data; retrieving deferred compensation and employee welfare benefit plan data; retrieving fair market value information relating to said data; computing company cost and length of program; and storing said retrieved and computed data.

With these and other objectives, advantages and features of the invention that may become apparent, the nature of the invention may be more clearly understood by reference to the following detailed description of the invention, the appended claims, and to the several drawings attached herein.

III. BRIEF DESCRIPTION OF THE DRAWINGS

FIG. 6 is a chart showing costs, benefits and values for a combination UNIQUE SOLUTION™/EWB plan and policy according to a third embodiment of the invention.

IV. DETAILED DESCRIPTION OF THE INVENTION AND OF THE PREFERRED EMBODIMENTS

The present invention may be implemented in whole, or in part, on a computer with a Pentium processor, hard drive, 16 Mb of RAM and by running an operation system comparable to Windows '95. It is expressly contemplated that at least one monitor is attached. Preferably a printer, modem and overhead projector are also attached thereto. It is expressly contemplated that the present invention may be implemented on a dedicated computer system. At least one input is provided for receiving modeling parameters. It should be noted that any combination of computer hardware (processor, monitor, memory, server, network, etc.) can be used to create the building blocks of the present system, as shown. It should also be noted that any of the software functions, steps or elements described herein can be implemented in any conventionally known computer.

Figure 1:
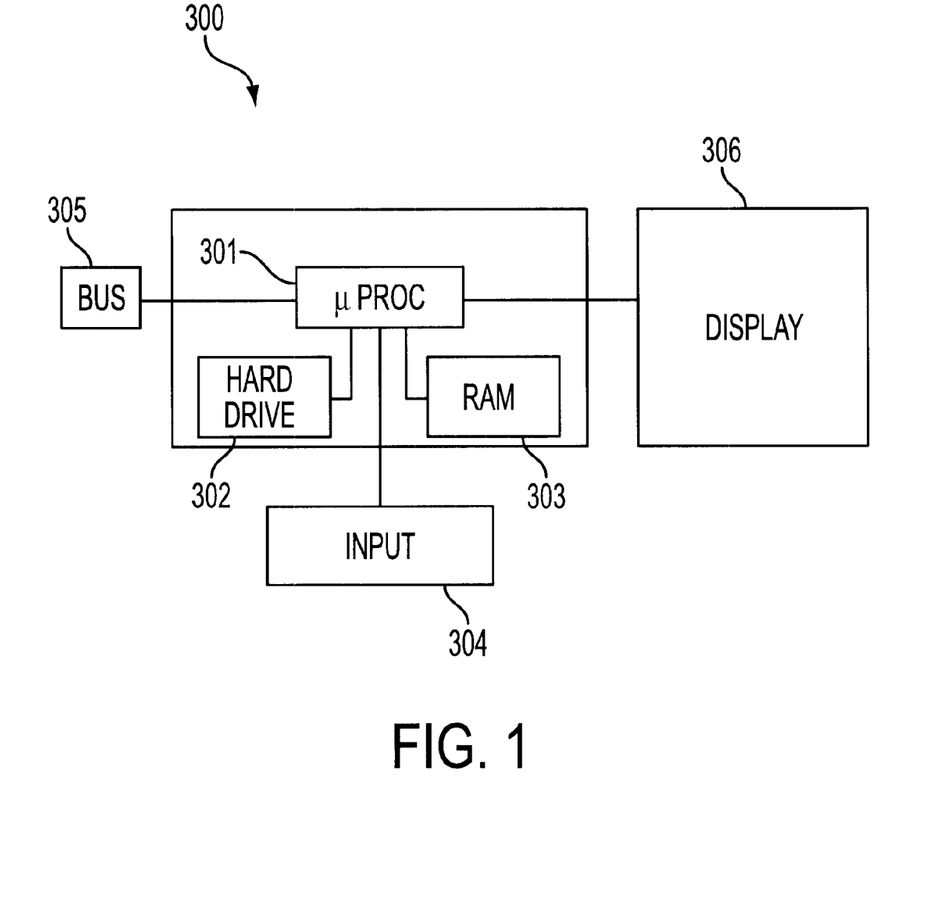
FIG. 1 is an apparatus for implementing the modeling program.

A preferred embodiment of an apparatus 300 to carry out the modeling program is shown in FIG. 1. A processor 301 is provided with a hard drive 302 and RAM 303. The hard drive 302 may be used to store predefined processes or data. The processor 300 is operationally connected to a manual input means, such as a keyboard and/or mouse 304. A bus 305 is provided that may comprise a conventional bus, infrared communication port, modem or the like. The bus 305 may be used to operationally attach the apparatus 300 to a modem, database or other source of data. A display or projector 306 is operationally connected to the processor 301. Those of ordinary skill in the art will realize that this is but one embodiment of an apparatus capable of implementing the modeling program and/or Rabbi Trust management program and that this embodiment may be modified using conventional components.

The present invention analyzes data that may be input and stored on the hard drive or that may be retrieved from other databases. It is expressly contemplated that the present invention may be designed to interface with a company's human resource (HR) data files to extract employee-related information. Extraction of HR data may be performed with the modeling program, in advance of running the modeling program, or after an initial set of modeling parameters has been input, but before final modeling factors are decided upon. It is expressly contemplated that financial information may likewise be obtained from a company's database, commercially available database, or retrieved from financial data stored on a computer's hard drive (not shown).

A. Program

Figure 2:
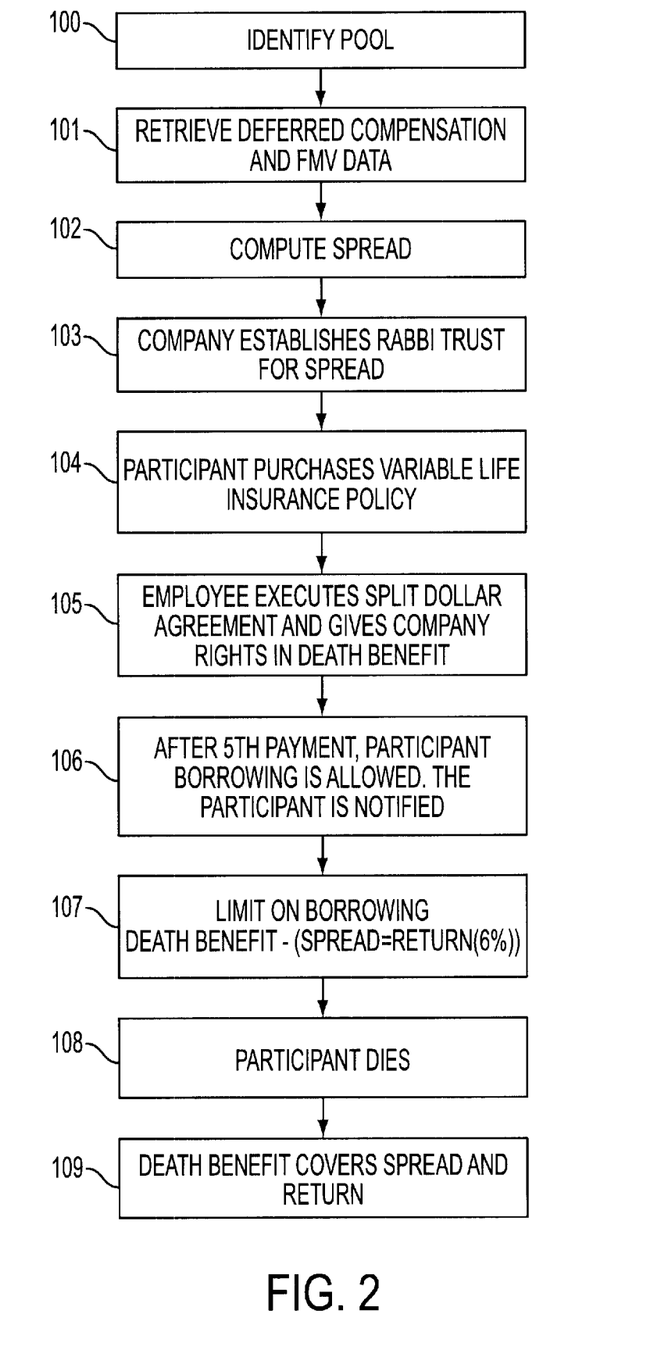
FIG. 2 is a schematic flow of the preferred embodiment of the computer program.

The steps of the program forming the preferred embodiment are set forth in FIG. 2. Although the steps are shown in order of intended implementation, those of ordinary skill will recognize that the steps in some cases may be rearranged or performed simultaneously.

The program is preferably designed to work with a publicly held corporation ("Employer"), but it is expressly contemplated that the program, modeling program and Rabbi Trust administration program may be used in other applicable settings. For example, they can be implemented by a consulting company, insurance company, instrument company, trust company, or any combination thereof Other employer and corporate entities are also contemplated herein. The program generally maintains a qualified or non-qualified deferred compensation plan ("Plan"), e.g. a stock option plan or other long-term compensation plan such as life insurance benefits, for the benefit of its employees, in particular highly compensated employees, officers and directors. The Plan provides an incentive for the employees, officers, directors and other key employees of the Employer to join or remain in the employment of the Employer and/or to maintain and enhance the Employer's long-term performance record through offering incentive awards. The Plan of the Employer authorizes the Employer to issue compensation such as stock options and stock to employees and qualifying non-employee directors (together, "Employees") who are participants. In the case of stock options, the plan would permit an Employee to purchase a share of the Employer's common stock ("Common Stock") for a price equal to the fair market value of the Common Stock on the date of issuance. An Employee cannot transfer the stock options under the Plan, and the Employees, as holders of a stock option under the Plan, do not receive the rights of shareholders until they exercise the stock option and the Employer issues the shares.

Due to the significant value of the stock options after being exercised and the fact that the ownership of the Employer will change after the stock issuance, the Employer desires to modify the terms of the Plan ("Modified Plan") to enable the Employer to take certain actions with regard to the outstanding, but unexercised, stock options. The Modified Plan will enable the Employer to preserve the current ownership of the Employer and at the same time recover expended funds through the conversion to the DASO® Plan, a UNIQUE SOLUTION™ Plan, and/or a combination UNIQUE SOLUTION™/EWB Plan (the "Combination Plan") as hereinafter described. In order to determine whether modification is appropriate, the Employer will perform a cost analysis of the programs to determine if the programs are consistent with the Employer's goals.

Under the Program, the Employer will seek to have the Employee agree to the following modifications to the Plan. When an Employee exercises his or her option by providing notice under the Modified Plan to the Employer, the Employee will be making an election to receive benefits, which may include cash, at a subsequent time. The Employer will determine whether the value of the option exceeds an exercise price of more than a dollar amount (the "Threshold") determined by the Employer. The Employer has determined that the exercise of many options under the Plan greater than the Threshold will be detrimental to the cash flow of the Employer since the Employer must use its resources to acquire the stock that has a purchase price greater than the original option price. In addition, the exercise of many options may result in a change of majority control of the Employer. By controlling the issuance of stock pursuant to the DASO® Plan and the Modified Plan, the Employer can also engage in better long-range planning based on changes in ownership and management of the Employer. The Employer has proposed the modifications contained in the Modified Plan to provide a fair and equitable means to minimize the detrimental effect of the exercise of the options on the Employer. However, the Employer will not modify options with an exercise price of less than the Threshold under the Modified Plan since such options are considered de minimus by the Employer.

Options greater than the Threshold will be the same as the original options except that the Employer (i) will place the Spread in a Rabbi Trust to provide the benefits under the Modified Plan; (ii) the Employee will agree to purchase the benefits from the Plan and Modified Plan; and (iii) the Employee will not receive stock upon exercise of the options. As additional consideration for having an Employee consent to the terms of the Modified Plan, the Employer will convert the arrangement into a cashless exercise. The options under the Modified Plan will not have a readily ascertainable fair market value when granted.

In another embodiment of the invention, the Employer will determine if an Employee Welfare Benefit (EWB) Plan, more preferably an Advantage 419 EWB Plan, is applicable to the Employee. (The term "Advantage 419 EWB Plan" is named so as to be in compliance with the provisions of Internal Revenue Service Code Section §419). Under the EWB Plan, the Employer will fund the premiums on a group-term life insurance policy on the Employee. The life insurance benefit has no cash surrender or accrual value, and is funded over the working life of each Employee covered. Under current Internal Revenue Service regulations, the cost of the premiums paid for the EWB Plan life insurance benefit is fully deductible to the Employer when paid. Under these circumstances, the life insurance benefit may be described as a death benefit for the Employee. Upon termination, the Employee's named beneficiaries receive the death benefit associated with the benefit.

Additionally, the Employer may also fund a deferred compensation plan for the Employee, which is similar to the DASO® Plan described above, but which does not necessarily involve stock or stock options. This deferred compensation plan may be more broadly referred to as the UNIQUE SOLUTION™. Like the DASO® Plan, the UNIQUE SOLUTION™ plan will work to minimize tax consequences to the Employee, but unlike the DASO® Plan, can involve any type of deferred compensation, e.g. such as life insurance. This deferred compensation plan or UNIQUE SOLUTION™ Plan will also require payment of premiums which will typically be made by the Employer. The UNIQUE SOLUTION™ Plan can take the form of a life insurance policy to be owned by the Employee. After an nth payment for the premium for the life insurance policy has been made, the policy will allow the Employee to borrow against the accrued cash value which is associated therewith. The Employer will typically not receive any up-front tax deduction when a premium on a UNIQUE SOLUTION™ Plan is paid as these payments are generally made using after-tax dollars. However, the Employer may recoup its costs of premiums made to the UNIQUE SOLUTION™ by assignment from the Employee. Thus when the Employee dies, for example, the Employer can recover the premiums expended, and optionally, a percentage return, e.g. 6%, which is compounded thereon.

When the deferred compensation arrangement just described for the UNIQUE SOLUTION™ or GREIT™ Plan is utilized with a non-profit employer, corporation or entity it may be referred to as a TARGET™ Plan (Tax Advantaged Retirement GREIT's Exempt Plan). The TARGET™ Plan complies with Internal Revenue Service Code Section §457 (f)(2)(c). The TARGET™ Plan has the same features as the UNIQUE SOLUTION™ or GREIT™ Plan.

The Combination Plan combines some of the preferred features associated with the EWB Plan and the deferred compensation UNIQUE SOLUTION™ life insurance policies. According to this hybrid plan, premiums for a combined plan life insurance policy for the Employee are split into two categories for payment. Premium payments which go into the 419 EWB Plan portion are managed separately from those that go towards the UNIQUE SOLUTION™ portion premiums. The Employer can receive the full tax deduction for the 419 EWB premiums when paid. A Rabbi Trust as previously described can be established to find the UNIQUE SOLUTION™ premiums, i.e. to ensure that any spread associated therewith is adequately funded. As set forth above, the Employer can recoup its premium costs associated with the UNIQUE SOLUTION™ portion upon death of the Employee. The Employee may borrow against the cash value of the UNIQUE SOLUTION™ portion, and incur little tax liability. If the amount borrowed is not paid back before the Employee's death, then that amount is simply deducted from the death benefit.

Thus as shown in FIG. 2, the first step in the program is to identify the pool 100 of candidates who will be evaluated for participation in the program, in particular the Combination Plan described above. The Employer may wish to evaluate a number of different employees from conventional HR data to determine what financial impact participation all or part of the pool will have. The total level of compensation, the number of stock options held, the age of the employee or other factors may be used by the Employer to decide which employees to place in the pool of candidates who will be considered for participation in any of the plans.

After the pool is identified, the next step is for the computer to retrieve their deferred compensation data 101. The deferred compensation data may include the amount of stock options they have been awarded, the type of exercisable option it is, the expiration date of the option, the grant price, the participant's age and other relevant human resource data. In this step, the Fair Market Value of the stock may be determined or projected. In the modeling application, it may be preferable to project what range a company's stock may fall in during a given time frame. The decision whether or not to implement the DASO® Plan may thus depend on the company's stock price as well as other relevant factors. If the Employer's data is kept in a format that is compatible with the implementing software and hardware, the data can be directly imported from the Employer. It is expressly contemplated that an extraction module can be used that places the Employer's data in the form required by the program's implementing software and hardware.

In the case of the GREIT™ Plan or Combination Plan, other information may have to be retrieved pursuant to step 101 relating to deferred compensation data as well as to employee welfare benefit data. For example, actuarial data relating to the Employee may also be necessary, such as projected life expectancy based on health risk factors and the like. This information will be necessary to help determine the employee welfare benefit, e.g. death benefit, associated with the Advantage 419 EWB portion of the Combination Plan.

In the case of the UNIQUE SOLUTION™ or Combination Plan, other information may have to be retrieved pursuant to step 101 relating to deferred compensation data as well as to employee welfare benefit data. For example, actuarial data relating to the Employee may also be necessary, such as projected life expectancy based on health risk factors and the like. This information will be necessary to help determine the employee welfare benefit, e.g. death benefit, associated with the 419 EWB portion of the Combination Plan.

In the case of a UNIQUE SOLUTION™ or Combination Plan for step 102, other ways of calculating the Spread may be chosen. For example, under these plans the Spread may simply be the level of deferred compensation or extended income which the Employer has agreed to provide to the Employee. In other circumstances, the Spread may equal the cost of the premiums necessary to purchase and maintain a certain monetary level of life insurance for the Employee pursuant to the Plan. In this way, the Employer will know what the cost of funding the premiums associated with the life insurance policy will be.

If the DASO® Plan, UNIQUE SOLUTION™ or Combination Plan is implemented, the next step is to establish a Rabbi Trust 103.

The Employee participant then purchases a life insurance policy (the Policy) at step 104. Alternatively the Policy may be purchased on behalf of the Employee, by the Employer for example. Under the Rabbi Trust component, the Employer will contribute the Spread (e.g., the cost of the premiums) to a "Rabbi Trust" established on behalf of the Employee. The Employer will establish the Rabbi Trust to provide a source of funds to the Policy owned by the Employee on the life of the Employee. The Spread deposited into the Rabbi Trust must be sufficient to pay each year the portion of the annual policy premium equal to the cost of the life insurance protection provided under the Policy. ( In the case of the DASO® Plan, if the Option Price or other amount is not sufficient to pay each year the portion of the annual policy premium equal to the cost of the life insurance protection provided under the Policy, the Employer may contribute to the Rabbi Trust such additional amounts.) The Employee would maintain the Policy during his or her lifetime in a face amount at least equal to the amount of the premium advances made by the Employer plus an optional accrued amount of, for example, six (6) percent. Any surplus of this amount under the Policy will be the sole and exclusive property of the Employee.

Under the DASO® Plan, UNIQUE SOLUTION™ Plan, the Employee and/or the Employer will contribute sufficient premium payments under the Policy within n years, for example five (5) years, so that the life insurance protection provided under the Policy is fully funded. Each year the premium payment is made, the Employee will receive an §83(b) election. The Employee will be required to file the election with the IRS within 30 days of the payment: Such notice can be automatically generated by the computer system. This assures tax benefits for the Employee. Thus, when the last premium payment is paid, the Employer expects that the cash surrender value will at least equal the Employer's premium outlays. After no additional premium payments are required under the Policy (e.g. five years), the Employee may borrow the cash value from the policy under the DASO® Plan, the UNIQUE SOLUTION™ Plan or the UNIQUE SOLUTION™ portion of the Combination Plan, which may equal or exceed the Spread. Upon the death of the Employee, the cash value will be recovered, such that the Employer will recover the present spread value plus an optional amount, e.g. six percent (6%), from the Policy. The remainder of the insurance proceeds will be paid to the Employee's beneficiaries. The Employer will not issue any Common Stock to the Employee under the Modified Plan as previously described. Instead, the deferred compensation will take the form of the life insurance benefits just described.

The Rabbi Trust provides satisfactory assurance to the Employee that the Spread has been segregated to provide the benefits identified in the Program. The Rabbi Trust is not intended to have a tax effect on the Employee, and the funds within the Rabbi Trust will remain subject to the claims of the Employer's creditors in case of bankruptcy or insolvency. Under the Combination Plan, the Rabbi Trust ensures that only the deferred compensation UNIQUE SOLUTION™ premiums are paid from the Trust. Those premiums which find the 419 EWB life insurance portion are maintained separately and apart from the Rabbi Trust (if desired, a second rabbi trust or similar arrangement may be established for the EWB life insurance premiums). As set forth above, the premiums paid into the Rabbi Trust may eventually be recovered by the Employer upon a qualifying event, e.g. death of the Employee. Premiums paid into the 419 EWB portion of the Combination Plan are normally fully tax deductible to the Employer when incurred. Maintaining the premiums separately thus helps to maintain this favorable corporate tax treatment from the IRS.

When the Policy is purchased a split dollar agreement is executed 105 that gives the company the right to receive at least a portion of the death benefit associated with the Policy. The Policy can be purchased online, using interactive capabilities of, for example, the Internet. The company receives that portion of the death benefit equal to the Spread plus an optional return, which is preferably approximately 6% pre-tax interest. It should be noted that the return may vary and it is expressly contemplated that any reasonable return may be used, for example, any return between 0.01% to 20%. Rates of return in the range of 5.75% to 6.25%, 5.5% to 6.5%, 5.25% to 6.75%, and 5.0% to 7.0% are expressly contemplated. Based on the economic factors in existence in the year 2000, it is expressly contemplated that the preferable rate of return is approximately 6%.

Under this split dollar agreement, which can be administered by the computer program, each year the Employer or the Employee will pay the portion of the annual policy premium equal to the cost of the life insurance protection under the Policy. The Employer or the Employee will apply the Spread to the obligation, but the Employee is liable for any shortfall in the premium. Any surplus of Spread after the payment of the policy premiums necessary to pay the costs of the life insurance protection under the Policy will be the sole and exclusive property of the Rabbi Trust. The split dollar life insurance agreement requires the Employer via the Rabbi Trust to advance the remainder of the annual premium for the first n years, e.g. five (5) years, that the Policy is effective in an amount not to exceed the Spread.

After the nth payment, e.g. fifth payment, of the life insurance premium by the Rabbi Trust, which may be administered by the management software, at step 106 the participant is notified by an appropriate output (e-mail, intranet posting, automatic written letter, etc.) that tax-free borrowing against the Policy, where applicable may begin. The participant's borrowing however is limited at step 107 that analyzes the insurance death benefit and compares that with the Spread plus the return due to the Employer. The Employee must maintain the Policy during his or her lifetime in a face amount at least equal to the amount of the premium advances made by the Employer plus six percent (6%). If the desired amount to be borrowed exceeds the permitted maximum, the company may be notified by the system so as to secure additional collateral. The Rabbi Trust administration software may also be used to monitor the Policy and ensure that all-applicable tax or other obligations that may effect the Employer's rights are attended to. Any factor, such as payment of any taxes related to the §83(b) election, may be automatically monitored by the Rabbi Trust management software to ensure that all payments are timely made.

In the case of the Combination Plan, only the portion attributable to the UNIQUE SOLUTION™ may be borrowed against since it is only this portion that has a cash surrender value. The 419 EWB portion of the Combination Plan has only a death benefit value, i.e. there is no cash value associated therewith from which an Employee participant may borrow.

The program may be implemented using s single dedicated computer or may comprise multiple computers that share information. For example, it is expressly contemplated that a single system can be implemented for modeling, while a second system may receive the data that corresponds to the selected employees and then implements and maintains the Rabbi Trust. It is also expressly contemplated that different groups may be responsible for different portions of the programs implementation.

In view of this program the following modeling and Rabbi Trust programs have been developed. Those of ordinary skill in the art will recognize that the present invention may be modified in keeping with the spirit of the present invention.

B. Modeling

The modeling program 200 is contemplated to be the first portion of the system that is used. The program 200 may reside on a computer or on a server. It is expressly recognized that the modeling program may be combined with other portions of the present invention or may be implemented separately.

There are several variable factors that may effect the Employer's decision to participate in the program. The modeling program permits multiple variables to be tested to see what impact the factors have on implementing the program. The modeling program is designed for use by the Employer, insurance company, program manager, employee or any combination thereof. The modeling program is designed to be used by a single entity but it is expressly contemplated that the modeling program may be divided into sub-parts that are performed by different entities.

When the Employer implements the program it can tie up its cash reserves. The Employer often uses its cash to fund the Rabbi Trust to pay for premiums on the life insurance policy. The Employer does not receive its cash back until the participant dies. The cost to the Employer is in the uncertainty of when the participant will die and what the difference is, if any, in return between the program's approximate 6% return and other investment opportunities the company would otherwise make. In an alternate embodiment, the Employer's costs will be offset by an economic evaluation of the impact on the company of a participant selling shares into the market. The modeling program is thus designed to provide the Employer with relevant information so as to decide whether or not to implement the program.

Figure 3:
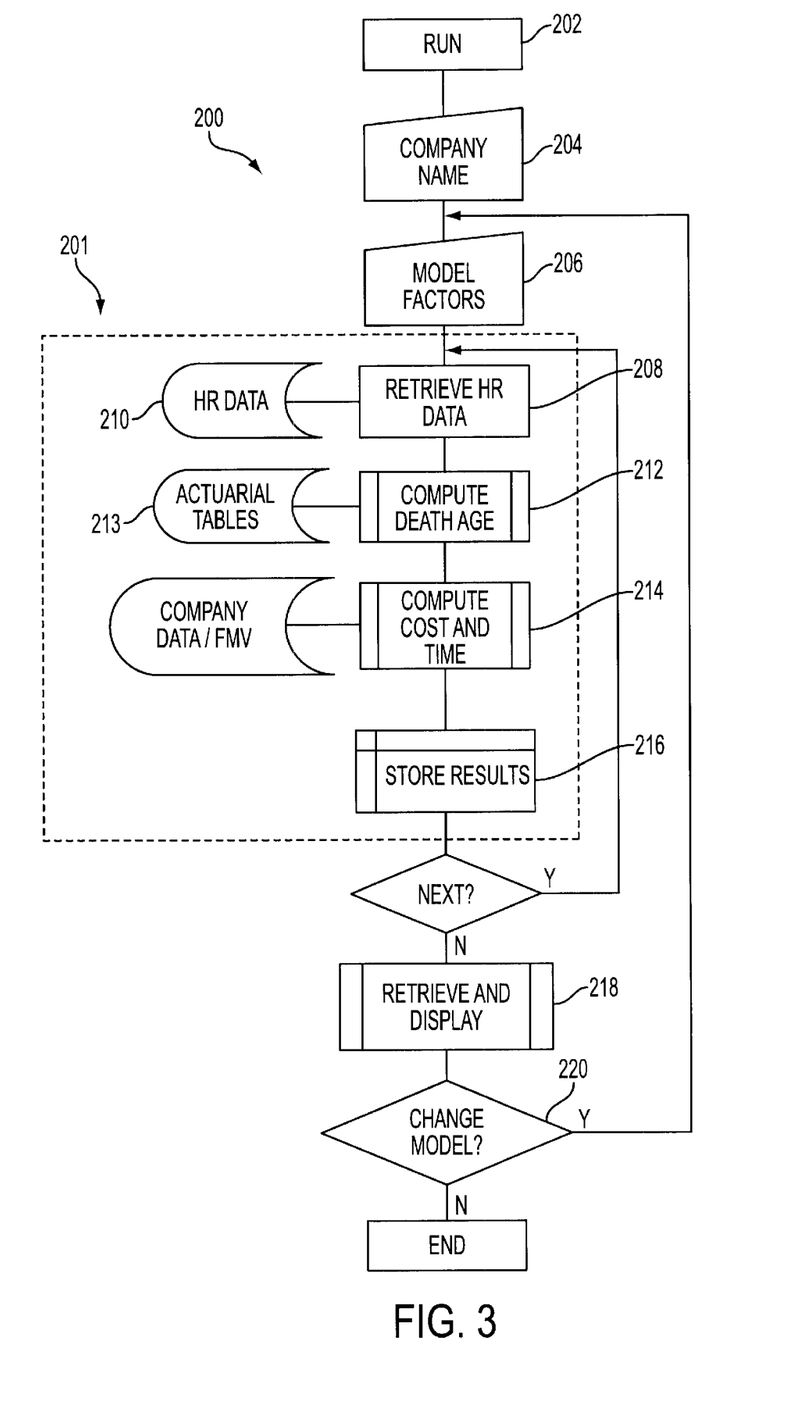
FIG. 3 is a flow chart of the DASO® Plan modeling program of the present invention.

The modeling program 200 is shown in FIG. 3. The Employer may choose to run step 202, a model based on selected employees or based upon cost and length of investment. For example, a program can be modeled for a top executive. Alternatively, the Employer may identify a group of top executives, a cash amount available for the program and a preferred length of time for the program. The modeling program 200 may be used to identify which top executives are most likely to meet the Employer's objectives.

The model program has two basic inputs: a company identity input 204 and model factors 206 input step. These two inputs may be combined or may each comprise multiple inputs. With regard to input 204, it is important to identify the company that is involved, or at least its basic financial data (stock performance, cash, etc.), and the pool factors. The pool factors may comprise any factor used to select individuals for modeling. Pool factors may include an employee's name, age, length of service with the company, management status, etc. Step 204 may include all of Company X's data prior to consulting with Company X. After this initial information is provided, a compute costs program 201 is executed. The compute cost routine 201 takes the input data from steps 204 and 206 and combines the data with human resource information provided at step 208. The routine calculates the death age of the participant at 212 using input data or actuarial tables 213. At step 214 the routing generates the cost information that is then stored and/or displayed in conjunction with the input data at step 216.

It should be noted that the input parameters may be entered in ranges. If ranges are input, the modeling program may compute and display the results in ranges. It is expressly contemplated that not all data points between the two ranges need to be immediately calculated. A zoom feature may be provided that re-calculates data within a range for more detailed financial analysis by the Employer.

The retrieved HR data 208 comes from an HR database 210. That database 210 can reside in a separate system. The HR data used by the modeling program 200 includes age, sex, marital status, age of spouse, health, and other employee welfare benefit data, etc. The retrieved HR data is used to compute the likely age of death of participants at step 212 and computing the cost to the company 214 of the most likely time frame the DASO® Plan, UNIQUE SOLUTION™ Plan, or the Combination Plan will be completed in (the time period until the participant dies) also at step 214. These computations may use information from internal databases or external databases. It is expressly contemplated that an interface program may be used to extract relevant information from existing databases. Alternatively, communication software may be used to obtain the relevant information from commercially available databases.

The modeling program 201 permits a number of different employees and company profiles to be analyzed. The results can be stored in the system 300 shown in FIG. 1 as shown in step 216 and be easily retrieved by the user at step 218. The results may be printed, displayed or otherwise sent to an intended recipient. Different employees or model factors can be selected at step 220 after the first set of results are retrieved and displayed in step 218.

It is important to recognize that at least the FMV and death ages of the participants are two items that are not known until the events occur. The uncertainty in these factors means that when results are analyzed, there are certain unknown factors. Thus, it is expressly contemplated that in an alternate embodiment the retrieve and display step 218 may comprise a weighting sub-routine that may be used to weigh those factors the Employer determines to be most important. For example, if the Employer determines that it may tie up ten million dollars in cash reserves but only for a time period of ten years, the time until death factor may be weighed more heavily. Pool participants can be identified who most likely will meet the company's objectives, and die in ten years. Other factors that may be used in the weighing sub-routine include expiration date of options, type of options, Grant Price, length of employment or other data.

The weighing subroutine includes a list of all variables that the analysis is based upon which is retrieved and displayed. The Employer may then assign weights to each factor. A percentage scale or high, medium, low scale may be used. It is expressly contemplated that unassigned factors may be assigned a default value. After the data is analyzed in the conventional manner, the results are displayed based on the weigh of the factors and the effect that factor has on the end result. For example, a high designation on "age over 65"0 will result in those participants with ages over 65 being displayed first. If a high designation is given in another category, an individual satisfying both high designations will be listed first. Individuals with high designations in only one of the two categories will be listed below.

As those of ordinary skill in the art will appreciate, the computing steps required will depend on the input factors. The database information may likewise be inputted or retrieved from an available database.

C. Rabbi Trust Administration Program

Once the company decides to implement the program and executes it, the management of the program shifts to the Rabbi Trust. The Rabbi Trust is used to pay the life-insurance policy premiums. The Rabbi Trust may also monitor participant borrowing or a life insurance agent may perform this function. The Rabbi Trust administration program may be implemented as a separate program than the modeling program above or may be combined therewith.

Figure 4:
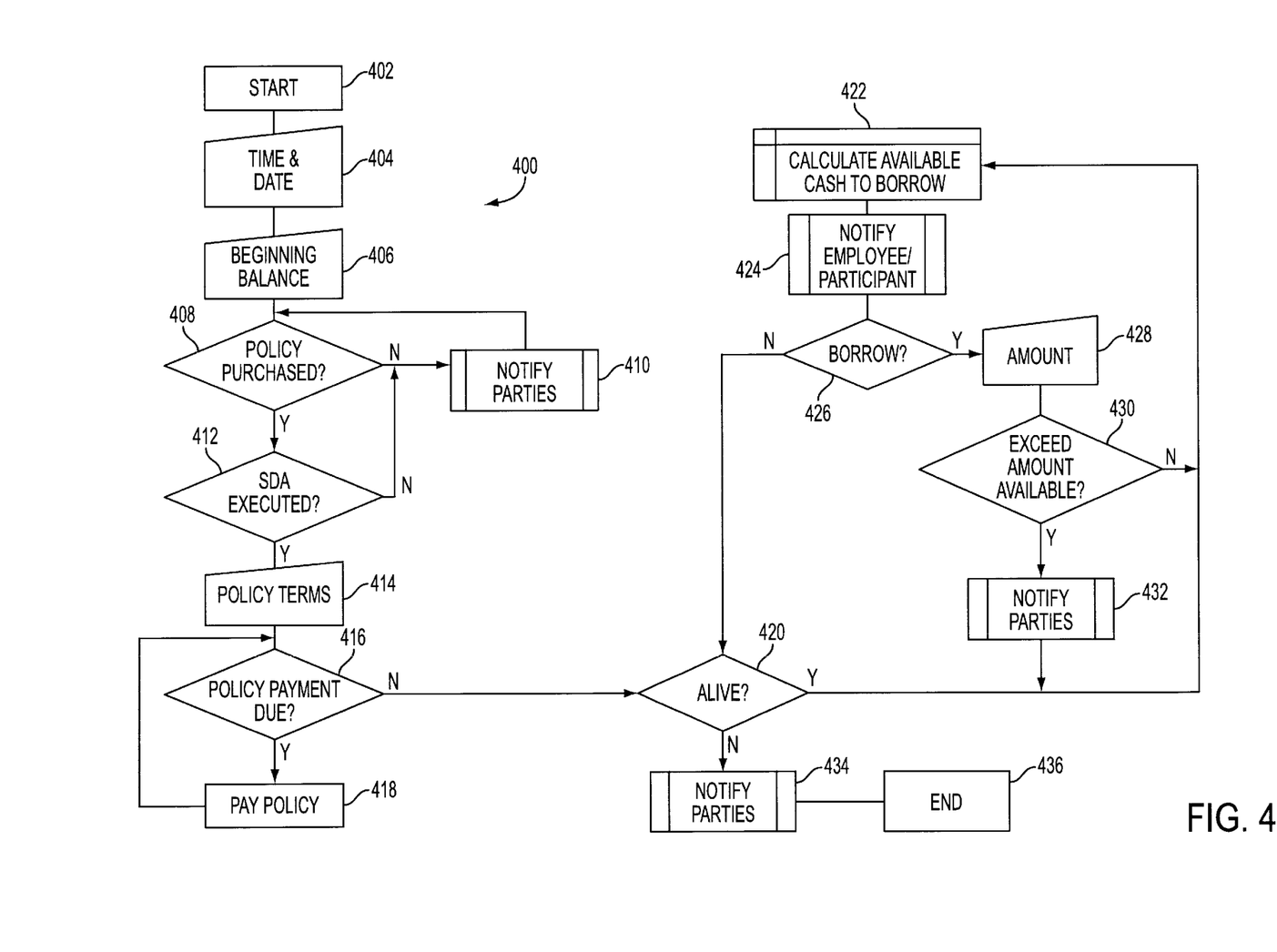
FIG. 4 is a flow chart of the Rabbi Trust maintenance and operating program.

FIG. 4 shows a flow chart of a Rabbi Trust administration program 400. The Rabbi Trust management software 400 may be used to make sure that all of the formalities associated with implementing the DASO® Plan, UNIQUE SOLUTION™ Plan or the Combination Plan are properly executed. For example, the software program may contain a Policy purchased input as well as a split dollar agreement executed input. If either of these inputs do not meet certain criteria, such as being properly executed and sent to a management company, the Rabbi Trust will not pay the n year premiums, e.g. 5 year premiums, on the Policy.

Once the program is successfully started at step 402, the program ensures the timely payment of the life insurance premiums. In step 404 the time and date are input. This input may be manual or electronic and is used to calculated when a certain number of effective years have past for tax purposes, e.g. five (5) years. The beginning balance is input at step 406. The beginning balance corresponds to the Spread.

The Rabbi Trust administration program then ensures that a Policy has been purchased at 408 and a split dollar agreement executed at 412. If either of these steps fail to meet certain predetermined criteria the parties are notified at step 410. If the Policy and split dollar agreement are executed in electronic form, or subsequently placed in an electronic form, the software may be designed to automatically extract the required information, such as validation, proper naming of death beneficiary, etc. If the Policy terms are not automatically input, they are input at step 414.

The program then cycles through five (5) tax years and pays the Spread against the Policy premiums at steps 416 and 418. It is expressly contemplated that the Spread will be completely used in five (5) years, but if it is not the program may be modified accordingly.

If the employee is still alive, then at step 420 the program calculates the amount that is available for borrowing on a tax free or reduced tax basis in step 422. The participant is notified in step 424, either manually or electronically that borrowing may begin. If the participant elects to borrow against the Policy, the amount that is being borrowed is input at 428. If the amount exceeds the amount available for borrowing, the parties are notified in step 432 and may arrange. for additional collateral or request that borrowing in excess of the amount not occur. This process continues until it is determined that the employee is no longer alive, at which point the parties are notified at step 434 and the program terminates at steps 436.

Those of ordinary skill in the art will recognize that this program may be modified and is not limited to the specific embodiment disclosed. For example, if the purchase of the Policy is automated, in addition to Policy information being input automatically, the program may be designed to exercise the split dollar agreement and automatically transfer funds upon the participant's death.

D. UNIQUE SOLUTION™ Plan System

The present invention can be modified to work with all deferred compensation and benefit planning programs. This program has previously been referred to as the UNIQUE SOLUTION™ or Guaranteed Reduced Estate and Income Tax (GREIT™) Plan. The UNIQUE SOLUTION™ Plan is similar to the DASO® Plan but uses the deferred income obligation of the company as the Spread otherwise associated with the DASO® Plan. The program's administration is similar to that of the DASO® Plan with minor modification to the modeling program 200.

Figure 5:
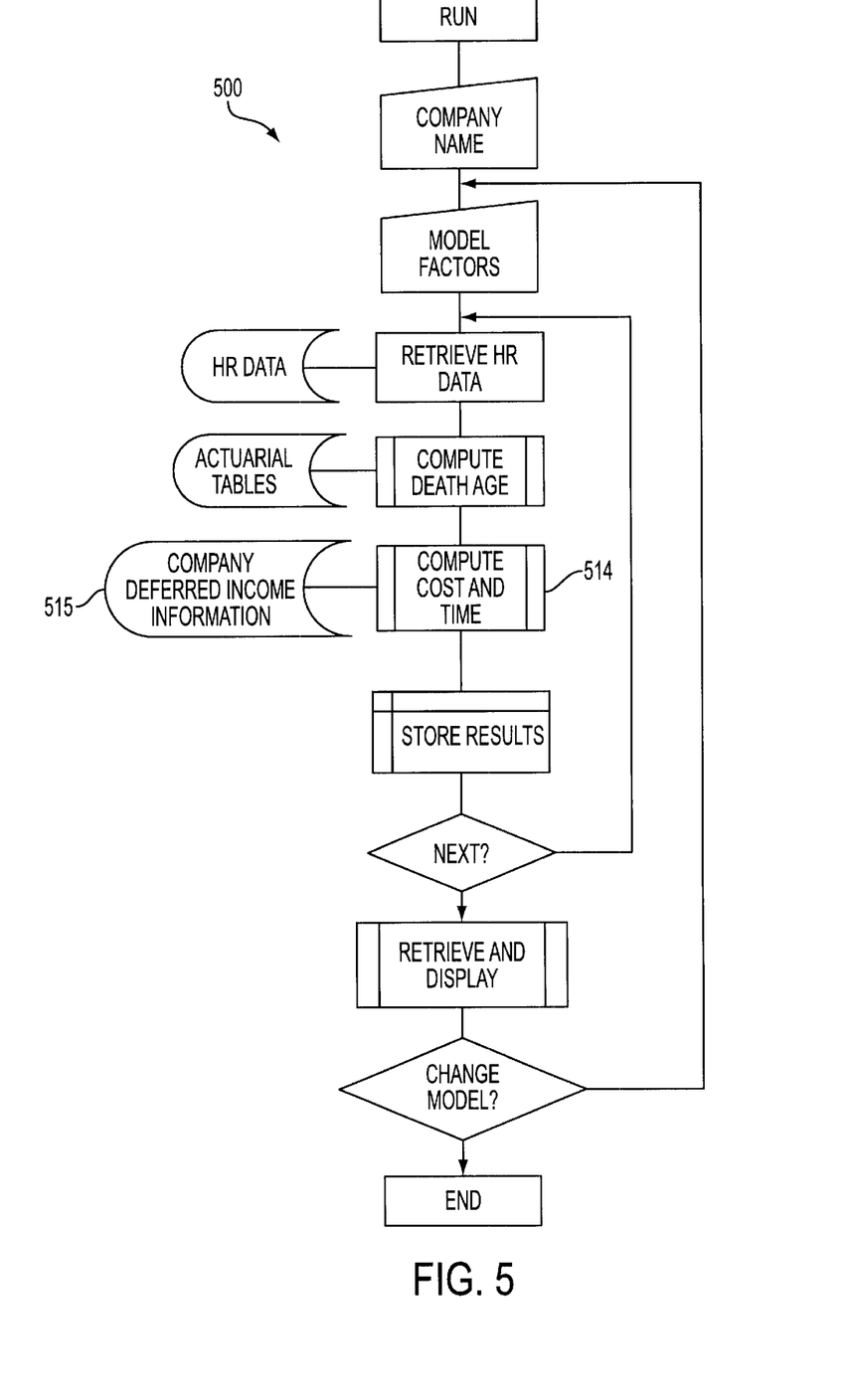
FIG. 5 is a flow chart of a second embodiment (UNIQUE SOLUTION™ program) of the present invention.

The Employer's obligation to the Employee in the form of deferred compensation may be placed into a Rabbi Trust and administered using a similar life insurance policy and split dollar agreement with Internal Revenue Code Section §83(b) elections. The cost to the company is likewise associated with the deferred compensation amount. FIG. 5 shows the UNIQUE SOLUTION™ Plan modeling program 500. Step 514 is modified to retrieve deferred income information as opposed to stock option information. The deferred income information may be retrieved from database 515 that may be the same or different from database 214 shown in FIG. 3.

E. The Tax Advantaged Retirement GREIT's Exempt Trust Plan or TARGET™ Plan System The TARGET™ Plan's system, methodology and modeling tracks that of the UNIQUE SOLUTION™ Plan set forth in Part D above, but is used for a non-profit employer, corporation or entity and complies with Internal Revenue Service Code Section §457(f)(2)(c).

F. The Combination Plan System

The present invention can also be modified to work with a combination UNIQUE SOLUTION™/419 EWB Plan which has already been referred to as the Combination Plan. FIG. 6 is a chart depicting costs, benefits and values for the Combination Plan. At Year 1, the Employer purchases a life insurance policy (the Policy) for Employee A (45 years old). The Policy has an annual premium of $105,000 and a death benefit of $7,088,046 when purchased. Under the Combination Plan, the premiums are split between the 419 EWB Plan and the UNIQUE SOLUTION™. Thus, $100,618 is used to fund the 419 EWB Plan portion, and $4,382 is utilized to find the UNIQUE SOLUTION™ portion. Under current IRS regulations, the $100,618 is deductible to the Employer when paid. Both the $100,618 and the $4,382 premium payments will be administered separately, and a distinct Rabbi Trust may be established for the UNIQUE SOLUTION™ portion premiums. As noted in column 6 of FIG. 6, the 419 EWB Plan portion of the life insurance policy has no cash surrender value. The UNIQUE SOLUTION™ portion does accrue a cash benefit which for Employee A at age 64 which amounts to $4,024,922 in column 12. This amount may represent the level of deferred compensation to the Employee and may be borrowed by the Employee with minimal or no tax consequences. The amount borrowed may reduce the size of the Employee's estate upon death and thereby decrease the amount of estate tax as well. The Employer may recover $87,640 shown in column 11 at year 20 (or upon death of the Employee). This amount represents a recoupment of the premiums expended ($4,382×20 years) for the UNIQUE SOLUTION™ portion of the Combination Plan.

Those of ordinary skill in the art will recognize the wide commercial applicability of the invention set forth above. Those of ordinary skill in the art will recognize the large commercial use of the apparatus and method herein described to companies and financial investor service providers. Those of ordinary skill in the art will recognize that the invention herein described and claimed may be modified and is not limited to the specific embodiments herein described.

I claim:

1. A method for identifying and administering a deferred award instrument plan through a computer system in order to reduce individual income and estate taxes, said method comprising the steps of:

identifying at least one employee for an employer in said deferred award plan;

retrieving financial data related to a deferred compensation plan and to an employee welfare benefit plan corresponding to said identified employee;

computing a spread associated with said deferred compensation plan;

establishing a rabbi trust with said spread;

determining whether an individual life insurance policy has been purchased by said employee, said life insurance policy combining features of said deferred compensation plan and said employee welfare benefit plan;

enabling under control of said employer said employer to purchase investments through said purchased life insurance policy;

determining whether a spilt dollar agreement has been executed;

monitoring whether said employer has paid at least one premium for said life insurance policy; and notifying said employee that a payment associated with said life insurance policy has been paid;

allowing said employee to borrow funds accumulated in said life insurance policy up to a limit set forth in said split dollar agreement, said limit reflecting a level of compensation according to said deferred compensation plan; and reporting to said employee an amount of tax savings;

representing said deferred award instrument plan by:
   inputting models factors based on actual performance;
   retrieving human resource data;
   retrieving deferred compensation data and employee welfare benefit data;
   retrieving fair market value information relating to deferred compensation and employee welfare benefit data;
   computing company cost and length of program; and
   storing said retrieved and computed data.

2. The method as claimed in claim 1 further comprising:
   converting said human resource data to a deferred award instrument plan format.

3. The method as claimed in claim 1 further comprising:
   converting said deferred compensation data to a deferred award instrument plan format.

4. The method as claimed in claim 1 further comprising:
   inputting weighing indicators corresponding to said model factors.

5. The method as claimed in claim 4 further comprising:
   displaying at least a predetermined portion of said retrieved and stored data based on said weighing indicators.

6. A system for implementing a deferred award instrument plan comprising:

a processor;

memory operationally attached to said processor;

an input device operationally attached to said processor;

a display device operationally attached to said processor;

an identifier for identifying at least one employee for an employer in said deferred award plan;

a retrieving unit for retrieving financial data related to a deferred compensation plan and employee welfare benefit plan;

a processor for computing a spread associated with at least one of said deferred compensation and said employee welfare benefit plans;

trust establishment unit for establishing a rabbi trust with said spread;

determining unit for determining whether an individual life insurance policy has been purchased by said employee;

a trading unit for enabling under control of said employer said employee to purchase stock or other investments through said purchased life insurance policy;

a determining unit for determining whether a split dollar agreement has been executed;

a monitor for monitoring whether said employer has paid at least one premium for said life insurance policy;

a notifier for notifying said employee that a payment associated with said life insurance policy has been paid;

a loan unit allowing said employee to borrow funds accumulated in said life insurance policy up to a limit set forth in said split dollar agreement said limit reflecting said employee's deferred compensation; and reporting unit for reporting to said employee an amount of tax savings;

modeling unit for representing said deferred award instrument plan by:
    inputting models factors based on actual performance;
    retrieving human resource data;
    retrieving employee welfare benefit plan and deferred compensation plan data;
    retrieving fair market value information relating to said employee welfare benefit plan and deferred compensation data;
    computing company cost and length of program; and
    storing said retrieved and computed data.

7. The system of claim 6, further including a converter for converting said deferred compensation data to a deferred award instrument plan format.

8. The system of claim 6, further including a second converter for converting said human resource data to a deferred award instrument plan format.

9. The system of claim 6, wherein said employee welfare benefit plan is a 419 employee welfare benefit plan.

10. The method of claim 1, wherein said employee welfare benefit plan is a 419 employee welfare benefit plan.

* * * * *